UNITED STATES PATENT OFFICE.

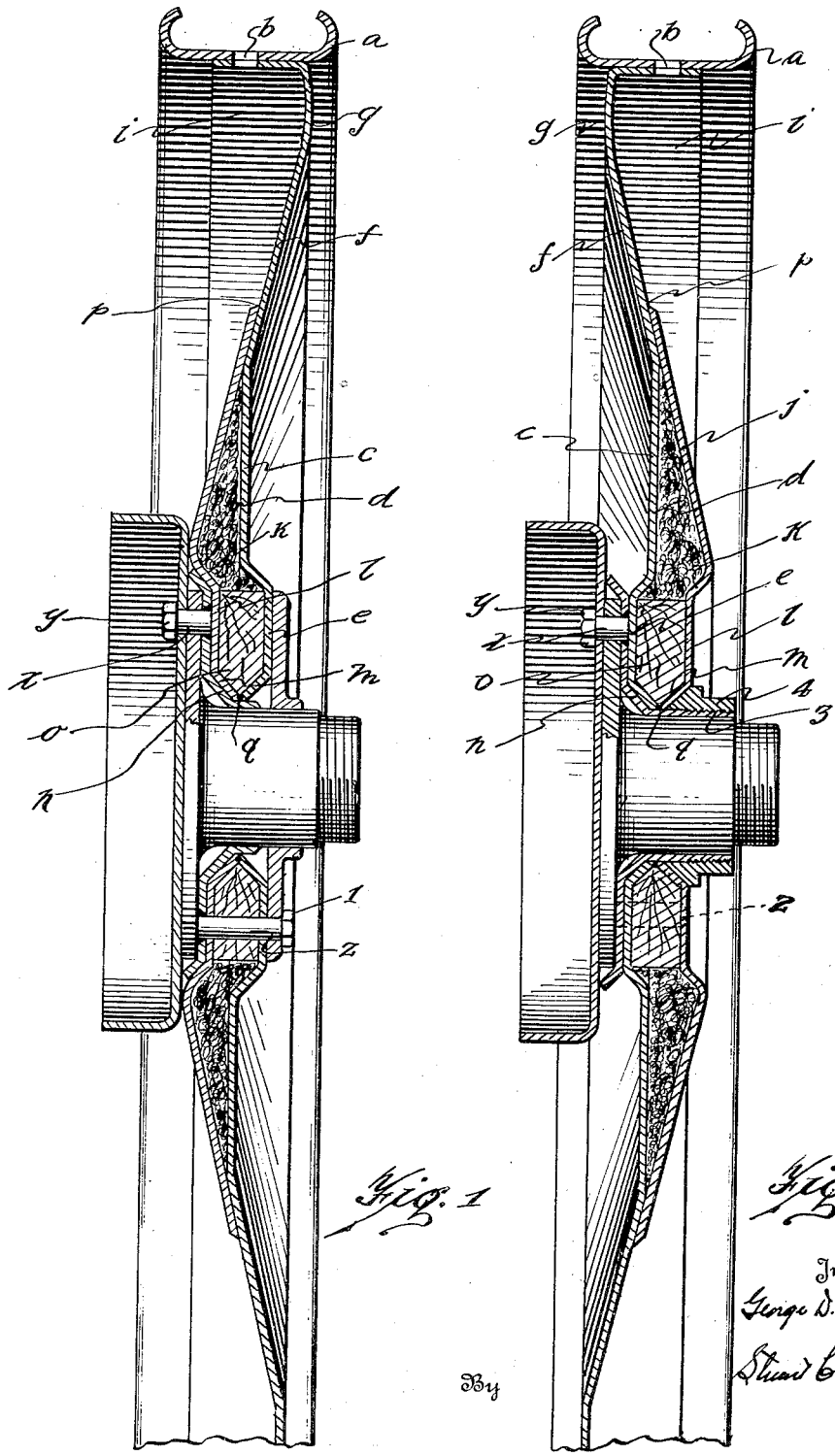

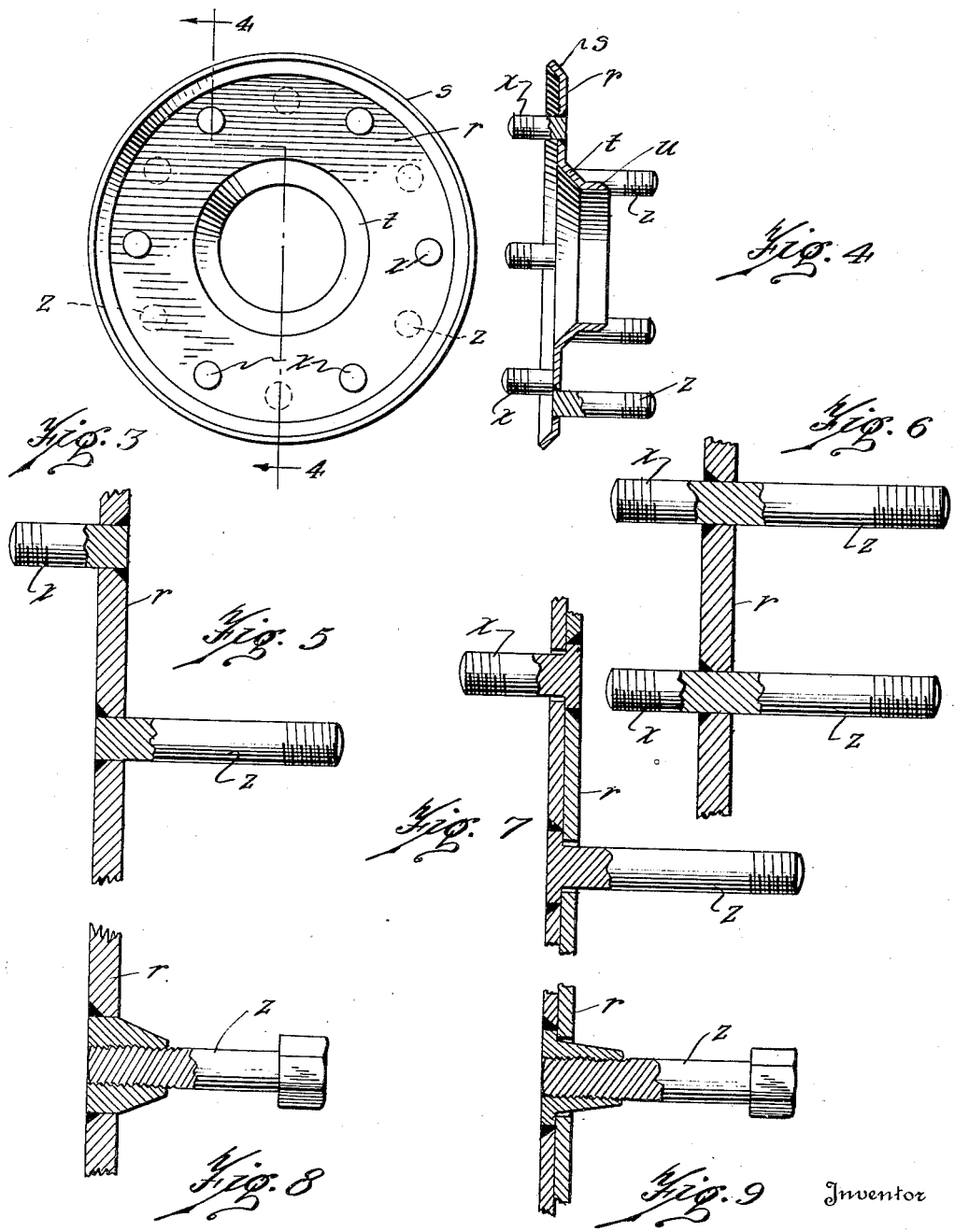

GEORGE D. SLAYMAKER, OF DETROIT, MICHIGAN.

DEMOUNTABLE WHEEL.

1,364,327.  Specification of Letters Patent.  Patented Jan. 4, 1921.

Application filed February 11, 1920. Serial No. 357,878.

*To all whom it may concern:*

Be it known that I, GEORGE D. SLAYMAKER, a citizen of the United States, residing at Detroit, in the county of Wayne and State of Michigan, have invented certain new and useful Improvements in Demountable Wheels, of which the following is a specification.

This invention relates to demountable wheels, and has for its object a demountable wheel seat or ring which can be attached to the front wheel spoke flange or the rear wheel brake drum of almost any car that is now provided with a wooden wheel. The demountable wheel seat or ring is so designed that it makes suitable provision to seat a demountable wheel either on the front or rear axle interchangeably notwithstanding the fact that the bolt holes through the ordinary spoke flange are either not suitable for such an attachment or vary so in their spacing as to make an interchangeable wheel out of the question.

Another feature of my invention is a new and improved disk wheel adapted to be seated upon this demountable wheel seat or ring and which is reversible, it being permissible to place it with either the tire valve on the inside of the wheel or on the outside. The disk wheel is further provided with a reinforcing disk which eliminates expensive construction in the way of making a disk of heavy thickness at the center of the wheel and of less thickness near the periphery of the wheel. These features will be better understood and easier to describe after the detailed description has been given.

In the drawings,—

Figure 1 is a vertical section of my demountable wheel seat or ring and my improved disk wheel seated thereon.

Fig. 2 is a vertical section of a modified form of demountable wheel seat or ring and showing the disk wheel reversed.

Fig. 3 is an inside elevation of the demountable wheel seat or ring.

Fig. 4 is a section of the same taken on the line 4—4 of Fig. 3.

Fig. 5 is a fragmentary section of the same showing how the threaded studs are attached.

Fig. 6 is a fragmentary section showing a modified form of demountable wheel seat or ring.

Fig. 7 is a fragmentary section of a still further modified form.

Figs. 8 and 9 are fragmentary sections of even further modified forms.

$a$ designates the channeled metal rim provided with a valve opening $b$. My disk wheel has a main disk $c$ that is a stamping. This disk is formed into an intermediate portion $d$ which is adapted to occupy substantially the center plane of the wheel, that is, it is approximately in the plane of the center line of the rim. The section next adjoining the section $d$ on the inside thereof forms a sort of annular channel $e$ with flaring side walls. The section next adjoining the section $d$ on the outside thereof is the section $f$ which angles away from the middle section $d$ toward the outer edge of the rim. The disk then curves slightly back forming the outer section $g$ which runs to the rim, where it turns right-angularly and runs parallel, forming the rim seat $i$. The channeled felly or rim can be secured to this rim seat by welding, riveting or other means. This angling away from the middle plane of the wheel forms a chamber all around the disk to receive the air valve.

The angling section $f$ also forms a seat for the reinforcing disk $j$, the major portion of which is formed into a shallow conical portion approximately on the same angle as the angling section $f$ of the main disk. The inner portion of this disk $j$ is formed into a section complementary to the annular channel section $e$ of the main disk. In order to accomplish this the conical portion of the reinforcing disk is turned in sharply at $k$, from which it continues in a plane parallel with the middle plane of the wheel to form a section $l$ that parallels the bottom of the annular channel $e$ of the main section. The extreme inner portion of the disk is turned in at an angle to form an abutment $m$ that meets the similarly turned-in abutment $n$ of the main disk. Between the bottom of the annular channel $e$ of the main disk and the flat section $l$ of the reinforcing disk is placed and confined the wooden spacer ring $o$. The reinforcing disk $j$ is welded or otherwise fastened at $p$ to the angling section $f$ of the main disk. It is also welded at $q$ where the two turned-in abutments meet. Between the main disk and reinforcing disk in the space not occupied by the wooden spacing ring I use mineral wool or other filling material to deaden the sound and dampen the hum set up by vibrating parts.

The disk wheel constructed on the lines and in the configuration just described is artistic and possesses great strength. It further has the advantage of being reversible, that is to say, the wheel can be placed with the tire valve on the inside, as shown in Fig. 1, or it may be easily reversed to be placed with the tire valve on the outside, as shown in Fig. 2, without in any way altering the gage of the wheels from wheel to wheel. This is due to the use of the reinforcing disk and the spacer, which makes the distance from the surface that abuts against the wheel seat to the center line of the wheel the same on either side of the wheel.

Referring to Figs. 3 to 9 inclusive, the various forms of demountable wheel seats and rings will be understood. I provide a ring $r$ which is flared in at the periphery to form the shallow bell $s$ for a purpose to be described. Near the center of this ring the same flares in to form an angular seat $t$ and a hub ring $u$. The angular seat $t$ is adapted to form a fairly wide bearing for the angular abutment $m$ or $n$ of the disk wheel. The flaring portion $s$ at the periphery of the ring in conjunction with the turned-in section $k$ of the reinforcing disk affords an additional seat for the disk wheel at a position somewhat more removed from the center of the wheel, where it is much more effective in stabilizing the wheel. Inasmuch as the wheel will almost always be used by motorists in the position shown in Fig. 1, this forms a very secure hold for the wheel upon the axle.

In a great many cars the wooden spoke flanges either have too many bolt holes for the attachment of a demountable wheel or else the number of bolt holes in the flanges of the front and rear wheel hubs varies and there is varying spacing so that a demountable wheel designed to be placed on a front wheel hub would be unsuitable for placing on the rear wheel hub. My demountable wheel seat or ring makes possible the accommodation of a demountable wheel of uniform construction on either the front or rear hub on almost any car. The ring can be provided with a special arrangement of inwardly-projecting studs $x$ suitably placed for conditions found on any car or on either the front or rear hub. These threaded studs are adapted to pass through the inner spoke flange that is usually an integral part of the hub. Nuts $y$ may then be run on the ends after the studs have been passed through the hub flange and brake drum, and this securely clamps the demountable wheel seat or ring to the brake drum and spoke flange. The outwardly-projecting studs $z$ can be uniformly arranged for taking a uniform demountable wheel and they can be the same for the front and rear wheel hubs although the inwardly-projecting studs $x$ may have to be specially arranged for this purpose. These studs are welded into countersunk portions as shown in Figs. 4 and 5. However, in Figs. 7 and 9, I have shown an arrangement of two demountable wheel seat rings and headed studs. The purpose of this is to prevent the studs being pulled out of the weld by turning the nuts down too tightly, for it will be seen that the opening through one disk is slightly less than the diameter of the head of the stud, and consequently any excess strain due to turning the nut down too tightly is taken by the head of the nut and the abutting disk. In Figs. 8 and 9 in place of showing a threaded stud welded to the disk and a nut, I have shown threaded sockets and cap screws. This is merely an equivalent construction.

In Fig. 6, I have shown the inner studs $x$ and the outer studs $z$ in the form of a single stud passing clear through the ring. This is possible in some cars and of course a preferred construction, if this is possible. Where the front and rear wheels have the bolt holes through the spoke flange spaced at the same points and suitably spaced to form driving studs for a demountable wheel, such a form of ring may be used.

From the showing in Fig. 1, it will be seen that the outwardly-projecting studs $z$ not only act as driving studs but they also serve to receive the nuts 1 by which the wheel is demountably secured to the demountable wheel seat or ring. If this form is not desired, the outwardly-projecting stud may be a simple stud, as shown in Fig. 2, and the demountable wheel ring or seat has an extended hub ring 3 that is externally threaded to receive the nut 4, which is provided with a conical seat adapted to engage against the turned-in abutment $m$ or $n$.

What I claim is:

1. The combination with a wheel hub provided with a flange having bolt holes therethrough, of a demountable wheel seat having a ring provided with inwardly-projecting threaded studs rigidly secured to the ring and adapted to pass through the bolt holes of the flange and outwardly-projecting studs rigidly secured to the ring and adapted to act as driving studs and receive the demountable wheel, and nuts on the ends of the inwardly-projecting threaded studs to hold the demountable wheel seat to the flange.

2. The combination of a wheel hub provided with a flange having bolt holes, and a demountable wheel seat in the form of a ring having inwardly-projecting threaded studs adapted to pass through the bolt holes in the flange and outwardly-projecting studs adapted to receive the demountable wheel, the said demountable wheel seat having a ring portion adapted to abut against the outside of the flange and having a flared portion merging into a hub ring, the flared portion adapted to aid in seating the demountable wheel.

3. The combination of a hub provided with a flange, and a demountable wheel seat comprising a ring having inwardly-projecting studs for fastening the ring to the flange and outwardly-projecting studs arranged to receive the wheel and arranged in offset relation with respect to the inwardly-projecting studs.

4. The combination with a wheel hub having a flange with bolt holes, of a demountable wheel seat comprising a ring portion with a flared periphery and a flared inner portion ending in a ring portion adapted to embrace the hub, said seat being provided with inwardly-projecting threaded studs and outwardly-projecting studs, the inwardly-projecting studs adapted to take nuts to hold the seat to the spoke flange and the outwardly-projecting studs adapted to receive a demountable wheel.

5. The combination with a wheel hub provided with a flange having bolt holes therethrough, of a demountable wheel ring made up of a pair of ring portions, and threaded studs having heads welded to one ring member and passing through openings of the other ring member smaller than the diameter of the heads, for the purpose described.

6. A disk wheel comprising a main disk member extending from the hub opening to the rim, a reinforcing disk secured thereto and terminating short of the rim and spaced therefrom intermediately, and a filling material filling the chamber formed by the spacing.

7. A disk wheel comprising a main disk extending from the hub opening to the rim, a reinforcing disk extending from the hub opening to about a mid point between the hub opening and the rim and secured at this point to the main disk, said disks forming a chamber therebetween, and a mineral wool filling in said chamber.

8. A disk wheel comprising a main disk having a flat intermediate portion $d$, a channeled inner portion $e$, an angling section $f$ on the outside of the flat intermediate portion $d$ and turned at right angles at its periphery to form a rim seat, and a reinforcing disk provided with an inner section $l$ complementary to the channeled section $e$ of the main disk and provided with an outer conical section $j$ adapted to abut against the section $f$ of the main disk and be secured thereto.

9. A disk wheel comprising a main disk provided with a flat intermediate section $d$, an inner channel section $e$, an angling section $f$ on the outside of the flat intermediate section $d$, and a right-angular rim seat at the periphery of the disk, and a reinforcing disk comprising a section $l$ complementary to the channel section $e$ of the main disk and a conical section $j$ adapted to abut against the section $f$ of the main section and be secured thereto, and a reinforcing ring spacing the two disks between the channel section $e$ and the companion section $l$.

10. A disk wheel comprising a disk extending from the hub opening to the rim and comprising an inner channel section $e$, an intermediate flat section $d$, an angling section $f$ on the outside of the flat intermediate section $d$ and having a turned-over rim flange and provided on its inside with a turned-in abutment $n$, and a reinforcing disk comprising a turned-over abutment $m$ adapted to engage the abutment $n$, a section $l$ complementary to the channel section $e$ of the main disk, and a conical section $j$ adapted to abut against the section $f$ and be secured thereto.

11. A disk wheel comprising a disk extending from the hub to the rim including a turned-in abutment $n$, a channel section $e$, a flat intermediate section $d$ on the middle line of the wheel, a flaring section $f$, a flat section $g$ parallel with the plane of the wheel terminating in a right-angular rim seat, a reinforcing disk in the form of a turned-in abutment $n$, a section $l$ complementary to the section $e$ of the main section and a conical section $j$ adapted to abut against and be secured to the section $f$, and a wooden spacing ring engaging in the chamber formed by the channel $e$ and the complementary section $l$ of the reinforcing disk.

In testimony whereof I affix my signature.

GEORGE D. SLAYMAKER.